US012403707B2

(12) United States Patent
Lee et al.

(10) Patent No.: US 12,403,707 B2
(45) Date of Patent: Sep. 2, 2025

(54) INKJET HEAD MANAGEMENT APPARATUS AND INKJET PRINTING APPARATUS

(71) Applicant: SEMES CO., LTD., Cheonan-si (KR)

(72) Inventors: Hosang Lee, Asan-si (KR); Suk-Won Jang, Pyeongtaek-si (KR); Jae-Duck Lee, Seongnam-si (KR); Won-Yong Jin, Cheonan-si (KR)

(73) Assignee: SEMES CO., LTD., Cheonan-si (KR)

( * ) Notice: Subject to any disclaimer, the term of this patent is extended or adjusted under 35 U.S.C. 154(b) by 239 days.

(21) Appl. No.: 18/303,342

(22) Filed: Apr. 19, 2023

(65) Prior Publication Data

US 2023/0347670 A1 Nov. 2, 2023

(30) Foreign Application Priority Data

May 2, 2022 (KR) ........................ 10-2022-0054248

(51) Int. Cl.
*B41J 2/045* (2006.01)
*B41J 29/02* (2006.01)
*B41J 29/377* (2006.01)

(52) U.S. Cl.
CPC ......... *B41J 29/377* (2013.01); *B41J 2/04566* (2013.01); *B41J 29/02* (2013.01)

(58) Field of Classification Search
CPC . B41J 29/377; B41J 29/02; B41J 29/00; B41J 29/12; B41J 2/04566; B41J 2/135; B41J 2/165; B41J 2/16579; B41J 2/04531; B41J 2/04538; B41J 2/0454; B41J 2/04553; B41J 2/04563; B41J 2/04565; B41J 2/01; G01G 23/18; G01N 25/62
See application file for complete search history.

(56) References Cited

U.S. PATENT DOCUMENTS

| | | | | |
|---|---|---|---|---|
| 8,282,187 | B2 | 10/2012 | Iwanaga | |
| 10,035,345 | B2 | 7/2018 | Hattori et al. | |
| 2004/0041892 | A1* | 3/2004 | Yoneyama | B41J 11/00214 347/102 |
| 2004/0047644 | A1 | 3/2004 | Carlson et al. | |
| 2013/0100215 | A1* | 4/2013 | Kuki | B41J 2/0454 347/88 |
| 2018/0147856 | A1* | 5/2018 | Sekiguchi | B41J 2/17509 |

FOREIGN PATENT DOCUMENTS

| | | | |
|---|---|---|---|
| JP | 2009-184132 | A | 8/2009 |
| JP | 2017-165033 | A | 9/2017 |
| JP | 2019107840 | A | 7/2019 |
| KR | 10-1072918 | B1 | 10/2011 |
| KR | 10-2013-0076909 | A | 7/2013 |

OTHER PUBLICATIONS

Office Action dated Dec. 6, 2023 issued by the Korean Intellectual Property Office for corresponding Korean Patent Application No. 10-2022-0054248.

* cited by examiner

*Primary Examiner* — Kristal Feggins
(74) *Attorney, Agent, or Firm* — Muir Patent Law, PLLC

(57) ABSTRACT

An inkjet head management apparatus for managing a humidity of an inkjet head including nozzles for ejecting droplets in an inkjet manner includes a housing having an opening on at least one surface thereof, a closer for opening or closing the opening of the housing, and a dehumidifier disposed in the housing to provide a dehumidifying atmosphere toward the opening when the opening is opened.

18 Claims, 7 Drawing Sheets

INKJET HEAD MANAGEMENT APPARATUS AND INKJET PRINTING APPARATUS

CROSS-REFERENCE TO RELATED PATENT APPLICATION

This application claims the benefit of Korean Patent Application No. 10-2022-0054248, filed on May 2, 2022, in the Korean Intellectual Property Office, the disclosure of which is incorporated herein in its entirety by reference.

BACKGROUND OF THE INVENTION

1. Field of the Invention

The present invention relates to a semiconductor apparatus and, more particularly, to an inkjet head management apparatus and an inkjet printing apparatus.

2. Description of the Related Art

When a printing process is performed on a transparent substrate to manufacture a display device, a printing apparatus including an inkjet head may be used. Color filters, electrodes, etc. of the display may be printed by ejecting droplets through nozzles of the inkjet head. Currently, quantum dots capable of emitting light by using an applied voltage or of emitting light by absorbing ambient light may be printed on a display substrate in the form of ink and used to display colors on the display substrate.

In the process using the inkjet head, the droplets need to be ejected well from a plurality of nozzles included in the inkjet head. When any of the plurality of nozzles does not eject the droplets well, it is regarded as process failure. That is, the nozzle which does not eject the droplets causes the Mura effect and thus is regarded as process failure. As such, when the droplets are not ejected from any nozzle, a maintenance process is performed on the nozzle through high-pressure purging or the like.

To prevent the inkjet nozzles from being clogged, it is considered significant to control the wetness of the inkjet head and the inkjet nozzles. In general, the drier it is, the more likely particles in the ink clog the nozzles. However, the high wetness of the inkjet head and the nozzles is not the only requirement. For example, an inkjet head using ink including a component such as metal or alloy to print electrodes may have a longer lifespan in a dry environment than in a humid environment. Ink including an inorganic component may not realize desired quality because the ink may deteriorate or the inorganic component is oxidized by moisture.

SUMMARY OF THE INVENTION

General inkjet printing apparatuses merely control the humidity of an overall printing process atmosphere and do not specifically control the humidity of an inkjet head part. Particularly, the general inkjet printing apparatuses do not keep only the inkjet head part dry separately from the printing process environment. Furthermore, because the humidity of the inkjet printing process atmosphere may be greatly affected by the season, exposure to an external environment due to accesses of workers to inkjet printing facility, etc., delicate humidity control of the inkjet head part is required. In addition, because special-purpose inkjet heads are high-priced, frequent replacement thereof may increase production costs and cause non-uniform printing quality.

The present invention provides an inkjet head management apparatus and inkjet printing apparatus capable of controlling a dehumidifying or drying atmosphere for an inkjet head.

The present invention also provides an inkjet head management apparatus and inkjet printing apparatus capable of separately maintaining the dehumidifying or drying atmosphere without being directly affected by a printing process atmosphere in an inkjet printing process, and of rapidly providing the dehumidifying atmosphere in a maintenance process of the inkjet head.

The present invention also provides an inkjet head management apparatus and inkjet printing apparatus capable of increasing a lifespan of the inkjet head and of preventing deterioration of ink.

However, the scope of the present invention is not limited thereto.

According to an aspect of the present invention, there is provided an inkjet head management apparatus for managing a humidity of an inkjet head including nozzles for ejecting droplets in an inkjet manner, the inkjet head management apparatus including a housing having an opening on at least one surface thereof, a closer for opening or closing the opening of the housing, and a dehumidifier disposed in the housing to provide a dehumidifying atmosphere toward the opening when the opening is opened.

A cover made of a flame retardant or thermal insulation material may be disposed on at least outer surfaces of the housing.

The opening may be provided on a top surface of the housing, and the inkjet head may approach the top surface of the housing.

The closer may open the opening in a humidity management process of the inkjet head, and close the opening in other processes.

The closer may include a power source mounted in the housing, and a shutter moved from the opening to a portion other than the opening by an operation of the power source.

The dehumidifier may include a desiccant for providing a dehumidifying atmosphere toward the opening, and a desiccant supporter for supporting the desiccant.

The desiccant supporter may include a desiccant frame, and a mesh connected to the desiccant frame and allowing air to pass therethrough.

The inkjet head management apparatus may further include a heater disposed in the housing to provide heat to the dehumidifier.

The heater may be disposed under the dehumidifier to provide heat to the dehumidifier while the opening is closed.

The inkjet head management apparatus may further include a desiccant weight sensor for measuring a weight of the desiccant in the dehumidifier.

When the weight of the desiccant is greater than a preset value, the heater may provide heat to the desiccant to evaporate moisture of the desiccant and reduce the weight of the desiccant.

The inkjet head management apparatus may further include a flexible contact part mounted around the opening on the housing to absorb impact upon contact with the inkjet head.

The inkjet head management apparatus may further include a humidity sensor disposed in the housing to sense a humidity near the opening.

The inkjet head management apparatus may further include a droplet discharger disposed in the housing to purge and suck droplets from the nozzles.

The inkjet head management apparatus may further include a vent mounted through a side of the housing to maintain an inner space of the housing at atmospheric pressure.

According to another aspect of the present invention, there is provided an inkjet printing apparatus for performing printing on a substrate by ejecting droplets in an inkjet manner, the inkjet printing apparatus including a substrate supporter for disposing the substrate thereon, an inkjet head including nozzles for ejecting droplets onto the substrate, a head mover for moving the inkjet head, and an inkjet head humidity manager for managing a humidity of the inkjet head, wherein the inkjet head humidity manager includes a housing having an opening on at least one surface thereof, a closer for opening or closing the opening of the housing, and a dehumidifier disposed in the housing to provide a dehumidifying atmosphere toward the opening when the opening is opened.

The head mover may move the inkjet head downward on the inkjet head humidity manager to dispose the nozzles under the inkjet head on the opening of the inkjet head humidity manager.

The closer may close the opening when the inkjet head performs printing on the substrate, and open the opening in a humidity management process of the inkjet head.

In the humidity management process of the inkjet head, the dehumidifier may provide a dehumidifying atmosphere to the inkjet head to reduce deterioration or oxidization of droplets caused by moisture in the inkjet head.

According to another aspect of the present invention, there is provided an inkjet head management apparatus for managing a humidity of an inkjet head including nozzles for ejecting droplets in an inkjet manner, the inkjet head management apparatus including a housing having an opening on a top surface thereof to allow the inkjet head to approach, a closer for opening or closing the opening of the housing, a dehumidifier disposed in the housing to provide a dehumidifying atmosphere toward the opening when the opening is opened, and a humidity sensor for sensing a humidity near the opening, wherein the dehumidifier includes a desiccant for providing a dehumidifying atmosphere toward the opening, and a desiccant supporter for supporting the desiccant and including a mesh allowing air to pass therethrough, wherein the closer closes the opening when the inkjet head performs printing on the substrate, and opens the opening in a humidity management process of the inkjet head, and wherein, in the humidity management process of the inkjet head, the dehumidifier provides a dehumidifying atmosphere to the inkjet head to reduce deterioration or oxidization of droplets caused by moisture in the inkjet head.

BRIEF DESCRIPTION OF THE DRAWINGS

The above and other features and advantages of the present invention will become more apparent by describing in detail embodiments thereof with reference to the attached drawings in which.

DETAILED DESCRIPTION OF THE INVENTION

Figure 1:
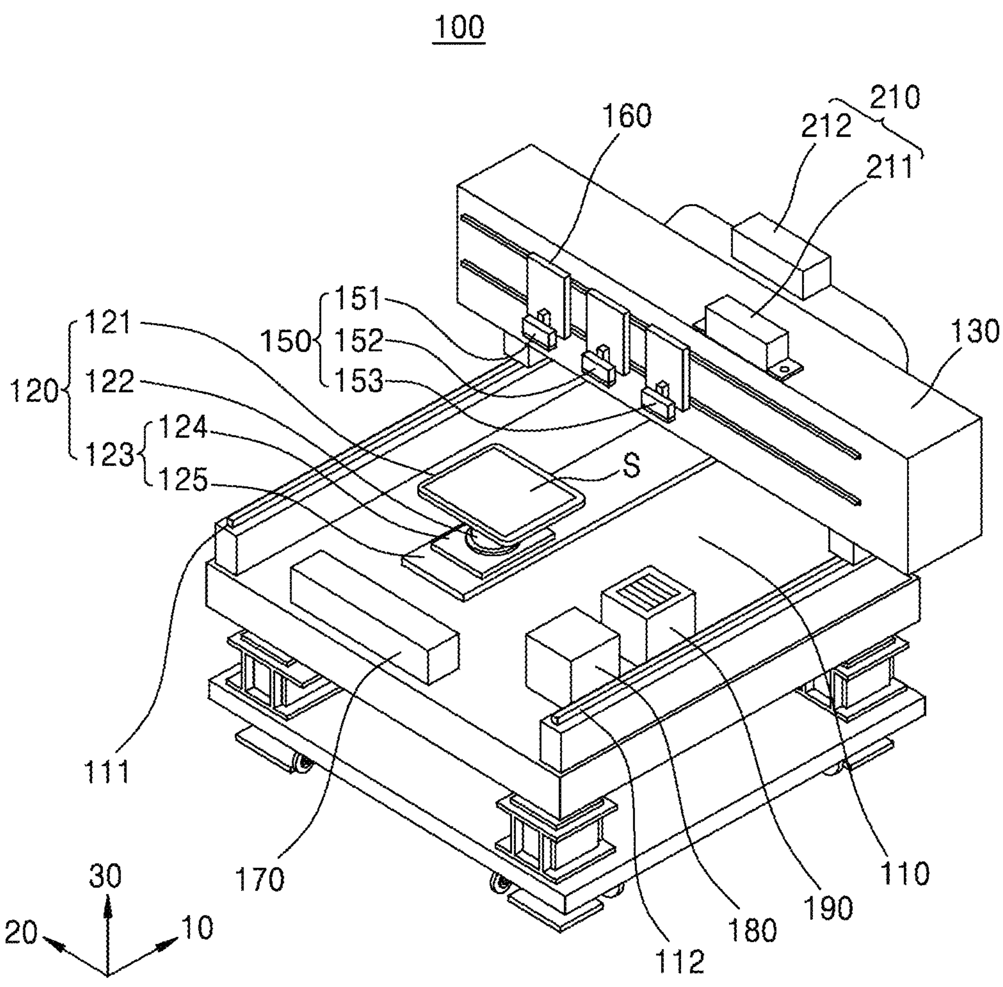
FIG. 1 is a perspective view of a printing system according to an embodiment of the present invention.

Hereinafter, the present invention will be described in detail by explaining embodiments of the invention with reference to the attached drawings.

The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art. In the drawings, the thicknesses or sizes of layers are exaggerated for clarity and convenience of explanation.

Embodiments of the invention are described herein with reference to schematic illustrations of idealized embodiments (and intermediate structures) of the invention. As such, variations from the shapes of the illustrations as a result, for example, of manufacturing techniques and/or tolerances, are to be expected. Thus, the embodiments of the invention should not be construed as limited to the particular shapes of regions illustrated herein, but are to include deviations in shapes that result, for example, from manufacturing.

Figure 2:
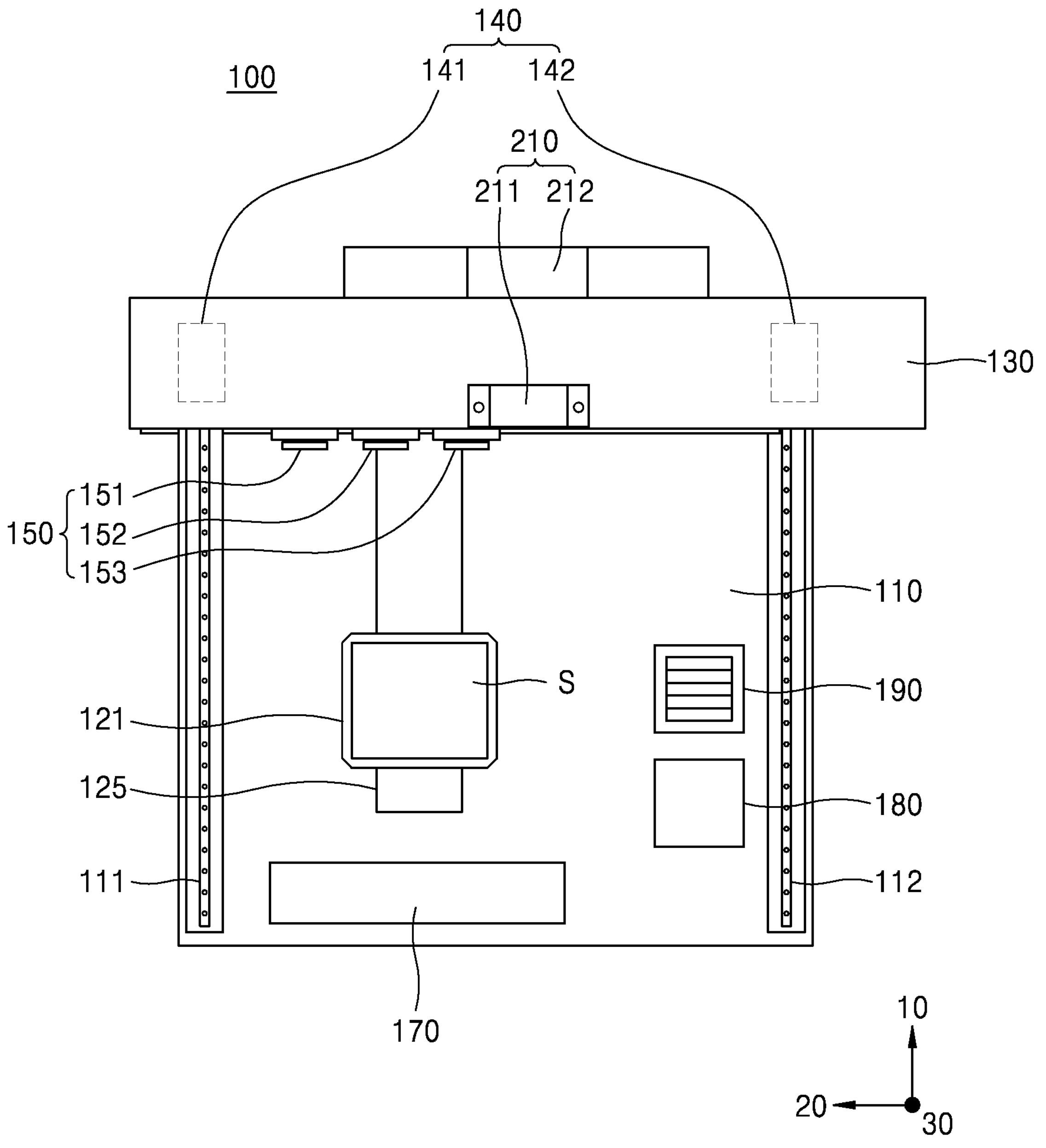
FIG. 2 is a plan view of a printing system according to an embodiment of the present invention.

FIG. 1 is a perspective view of a printing system 100 according to an embodiment of the present invention. FIG. 2 is a plan view of the printing system 100 according to an embodiment of the present invention.

Referring to FIGS. 1 and 2, the printing system 100 may include a base 110, a substrate supporter 120, a gantry 130, a gantry mover 140, an inkjet head 150, a head mover 160, a droplet ejection amount measurer 170, a nozzle inspector 180, and a nozzle manager 190. In this specification, a first direction 10 may correspond to an x-axis direction, a second direction 20 may correspond to a y-axis direction, and a third direction 30 may correspond to a z-axis direction.

The base 110 may be provided in a cuboid shape having a certain thickness. The substrate supporter 120 is disposed on a top surface of the base 110.

The substrate supporter 120 may have a support plate 121 on which a substrate S is placed. The support plate 121 may be a rectangular plate. A rotary driving member 122 may be connected to a bottom surface of the support plate 121. The rotary driving member 122 may be a rotary motor. The rotary driving member 122 may rotate the support plate 121 about an axis of rotation perpendicular to the support plate 121. When the support plate 121 is rotated by the rotary driving member 122, the substrate S may be rotated by the rotation of the support plate 121. When a long side direction of cells provided on the substrate S to be coated with droplets faces the second direction 20, the rotary driving member 122 may rotate the substrate S in such a manner that the long side direction of the cells faces the first direction 10.

The support plate 121 and the rotary driving member 122 may be linearly moved in the first direction 10 by a linear driving member 123. The linear driving member 123 may include a slider 124 and a guide member 125. The rotary driving member 122 may be mounted on a top surface of the slider 124. The guide member 125 may extend in the first direction 10 in the middle of the top surface of the base 110. The slider 124 may have an embedded linear motor (not shown), and be linearly moved in the first direction 10 along the guide member 125 by the linear motor (not shown).

The gantry 130 may be provided above a path along which the support plate 121 is moved. The gantry 130 may be spaced apart from the top surface of the base 110 in a vertical direction, and disposed in such a manner that a longitudinal direction thereof is parallel to the second direction 20.

The gantry mover 140 may linearly move the gantry 130 in the first direction 10. The gantry mover 140 may include a first moving unit 141 and a second moving unit 142. The first moving unit 141 may be provided at an end of the gantry 130, and the second moving unit 142 may be provided at another end of the gantry 130. The first moving unit 141 may slide along a guide rail 111 provided at a side of the base 110, and the second moving unit 142 may slide along a guide rail 112 provided at another side of the base 110, thereby linearly moving the gantry 130 in the first direction 10.

The inkjet head 150 may be coupled to the gantry 130 by the head mover 160. The inkjet head 150 may be linearly moved in the longitudinal direction of the gantry 130 (or the second direction 20) or in the third direction 30 by the head mover 160. In addition, the inkjet head 150 may rotate about an axis parallel to the first direction 10 with respect to the head mover 160.

The inkjet head 150 ejects droplets onto the substrate S. A plurality of inkjet heads 150 may be provided. Three inkjet heads 150, e.g., a first head unit 151, a second head unit 152, and a third head unit 153, may be provided but the number of inkjet heads 150 is not limited thereto. The plurality of inkjet heads 150 may be coupled to the gantry 130 in a row in the second direction 20.

Each inkjet head 150 may include a plurality of nozzles 155 (see FIG. 6) for ejecting droplets, and a nozzle plate 157 on which the plurality of nozzles 155 are provided. The inkjet head 150 may be provided with, for example, 128 or 256 nozzles.

The inkjet head 150 may be provided with piezoelectric elements corresponding to the number of nozzles 155. Droplet ejection amounts of the plurality of nozzles 155 may be independently adjusted by the control of voltages applied to the piezoelectric elements.

The head mover 160 may be provided for each inkjet head 150. In the current embodiment, because three inkjet head units 151, 152, and 153 are provided, three head movers 160 may be provided to correspond to the number of inkjet heads 150. Unlike this, a single head mover 160 may be provided and, in this case, the inkjet head units 151, 152, and 153 may be moved together rather than individually.

The droplet ejection amount measurer 170 may measure a droplet ejection amount of the inkjet head 150. The droplet ejection amount measurer 170 may be disposed on the base 110 at a side of the substrate supporter 120. The droplet ejection amount measurer 170 may measure the amount of droplets ejected from all nozzles 155 (see FIG. 6) of the inkjet head 150. By measuring the droplet ejection amount of the inkjet head 150, an error of all nozzles 155 of the inkjet head 150 may be macroscopically checked. That is, when the droplet ejection amount of the inkjet head 150 exceeds a reference value, it may be determined that at least one of the inkjet head 150 has an error.

The inkjet head 150 may be moved in the first and second directions 10 and 20 by the gantry mover 140 and the head mover 160 and positioned above the droplet ejection amount measurer 170. The head mover 160 may move the inkjet head 150 in the third direction 30 to adjust a vertical distance between the inkjet head 150 and the droplet ejection amount measurer 170.

The nozzle inspector 180 may check an error of the individual nozzles 155 (see FIG. 6) provided in the inkjet head 150, through optical inspection. When the measurement result of the droplet ejection amount measurer 170 macroscopically indicates that an unspecified nozzle has an error, the nozzle inspector 180 may inspect all nozzles by checking an error of individual nozzles.

The nozzle inspector 180 may be disposed on the base 110 at a side of the substrate supporter 120. The inkjet head 150 may be moved in the first and second directions 10 and 20 by the gantry mover 140 and the head mover 160 and positioned above the nozzle inspector 180. The head mover 160 may move the inkjet head 150 in the third direction 30 to adjust a vertical distance between the inkjet head 150 and the nozzle inspector 180.

The nozzle manager 190 may perform a management process to allow droplets to be readily ejected from the nozzles 155 of the inkjet head 150. The management process includes a process of adjusting a humidity of the inkjet head 150 or providing a drying/dehumidifying atmosphere. The nozzle manager 190 may be disposed on the base 110 at a side of the substrate supporter 120. The inkjet head 150 may be moved in the first and second directions 10 and 20 by the gantry mover 140 and the head mover 160 and positioned above the nozzle manager 190. The head mover 160 may move the inkjet head 150 in the third direction 30 to adjust a vertical distance between the inkjet head 150 and the nozzle manager 190.

The inkjet heads 150 including the inkjet head units 151, 152, and 153 may be moved individually and connected to different head movers 160 or the gantry mover 140. In this case, while a specific one of the inkjet head units 151, 152, and 153 is positioned above the nozzle manager 190 and a humidity management process is being performed, a printing process may be performed on the substrate S by the others of the inkjet head units 151, 152, and 153. As such, the printing process and the management process of the inkjet heads 150 may be performed simultaneously and thus a process time may be reduced.

Meanwhile, the printing system 100 may further include a droplet supply device 210. The droplet supply device 210 may be mounted on and at a side of the gantry 130. The droplet supply device 210 includes a droplet supply module 211 and a pressure adjustment module 212. The droplet supply module 211 and the pressure adjustment module 212 may be coupled to the gantry 130. The droplet supply module 211 receives droplets from the droplet supply device 210, and supplies the droplets to the inkjet head 150. The pressure adjustment module 212 adjusts a pressure of the droplet supply module 211 by providing a positive or negative pressure to the droplet supply module 211.

Figure 3:
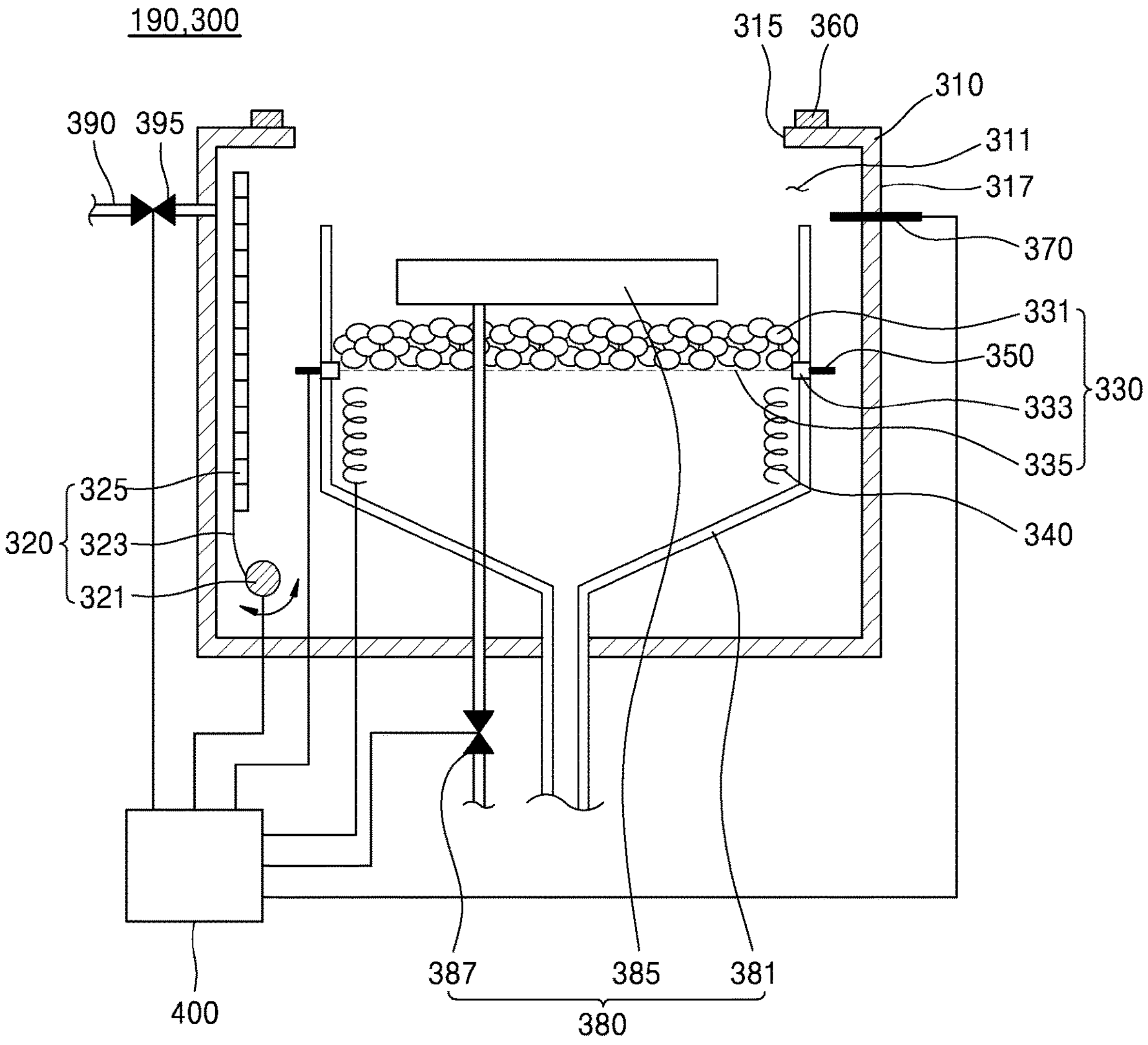
FIG. 3 is a side cross-sectional view of an inkjet head management apparatus according to an embodiment of the present invention.

FIG. 3 is a side cross-sectional view of an inkjet head management apparatus 300 according to an embodiment of the present invention. The inkjet head management apparatus 300 corresponds to the nozzle manager 190 of FIGS. 1 and 2. In relation to FIG. 3 and the subsequent drawings, the nozzle manager 190 will be referred to as or used interchangeably with the inkjet head management apparatus 300.

Referring to FIG. 3, the inkjet head management apparatus 300 may be provided to manage a humidity of the inkjet head 150. The inkjet head management apparatus 300 may be provided to manage the humidity only for the inkjet head 150 among various elements of the inkjet printing system 100. Particularly, the inkjet head management apparatus 300 may be provided to control a dehumidifying or drying atmosphere for the inkjet head 150.

The inkjet head management apparatus 300 may include a housing 310, a closer 320, and a dehumidifier 330. According to an embodiment, the inkjet head management apparatus 300 may further include a heater 340, a desiccant weight sensor 350, a flexible contact part 360, a humidity sensor 370, a droplet discharger 380, a vent 390, and a controller 400.

The housing 310 may be provided as a body of the inkjet head management apparatus 300 to dispose various elements of the inkjet head management apparatus 300 in its inner space 311. The housing 310 may have a substantially hexahedral shape but is not limited thereto.

The housing 310 may have an opening 315 on at least one surface thereof. The opening 315 is open to allow the inner space 311 of the housing 310 to interact with an atmosphere outside the housing 310. The opening 315 is provided to allow the inkjet head 150 to approach. When the inkjet head 150 approaches, it means that the inkjet head 150 or the nozzles 155 are brought into close contact with, inserted into, or disposed close to the opening 315.

The opening 315 may be provided on a top surface of the housing 310 such that the nozzles 155 (see FIG. 6) of the inkjet head 150 may move downward to approach. However, the opening 315 may be provided on another surface of the housing 310 as long as the opening 315 allows the inkjet head 150 to approach. The opening 315 may have a size corresponding to the size of one or more head units 151, 152, and 153.

According to an embodiment, a cover 317 may be disposed on at least outer surfaces of the housing 310. The cover 317 may be provided as a separate plate connected or attached to the outer surfaces of the housing 310, or integrated with the outer surfaces of the housing 310. The cover 317 may be mounted to prevent an atmosphere of the inner space 311 of the housing 310 from affecting elements of the printing system 100 outside the housing 310. For example, the cover 317 may prevent heat energy of the inner space 311 of the housing 310 from being transferred to the other elements of the printing system 100. The cover 317 may be made of a flame retardant or thermal insulation material such as expanded polystyrene or glass fiber.

The closer 320 is provided to open or close the opening 315 of the housing 310. According to an embodiment, the closer 320 may include a power source 321 and a shutter 325.

The power source 321 may be mounted in the housing 310 to provide power for moving the shutter 325. The shutter 325 may directly open or close the opening 315. The shutter 325 may be moved from the opening 315 to a portion other than the opening 315 or vice versa by the operation of the power source 321. A power transmitter 323 for transmitting power may be further interposed between the power source 321 and the shutter 325. For example, the power source 321 may include a motor and the shutter 325 may include a plurality of unit shutters, and the shutter 325 may be pushed or pulled by the operation of the motor to open or close the opening 315. Alternatively, the shutter 325 may be wound or unwound by the operation of the power source 321 to open or close the opening 315.

The dehumidifier 330 may be disposed in the housing 310 to provide a dehumidifying or drying atmosphere toward the opening 315. The dehumidifier 330 may provide a dehumidifying or drying atmosphere toward the opening 315 when the opening 315 is opened. Because the inkjet head 150 is close to the opening 315 when the opening 315 is opened, the dehumidifier 330 may provide a dehumidifying or drying atmosphere to the inkjet head 150.

The dehumidifier 330 may include a desiccant 331 and a desiccant supporter 333 and 335.

Any material having a dehumidification function may be used as the desiccant 331 without limitation. For example, silica gel may be used as the desiccant 331. Silica gel is a porous granular material containing silicon dioxide, i.e., silica, as a main component, and has a large specific surface area due to its porous structure and may absorb moisture well. In addition, silica gel is easily reusable because the absorbed moisture is released when heat is applied.

The desiccant supporter 333 and 335 may include a desiccant frame 333 and a mesh 335. The desiccant frame 333 may be connected to the inside of the housing 310 or the droplet discharger 380. The desiccant frame 333 may be provided detachably. The desiccant frame 333 may have a hollow hole to which the mesh 335 is connected. The desiccant frame 333 may be made of a rigid material such as metal to support the weights of the mesh 335 and the desiccant 331 contained in the mesh 335.

The mesh 335 is provided to contain the desiccant 331. The mesh 335 has a mesh structure through which air passes well, to allow the supported desiccant 331 to easily absorb or release moisture. The mesh 335 may have an opening size less than a diameter of the desiccant 331 to prevent the desiccant 331 from leaking downward.

Meanwhile, the dehumidifier 330 may not consist of the desiccant 331 and the desiccant supporter 333 and 335, but be provided as an electric dehumidifier for performing a dehumidification function.

The heater 340 may be disposed in the housing 310 to provide heat to the inner space 311 of the housing 310. Particularly, the heat of the heater 340 may be provided to the dehumidifier 330. The heater 340 may be provided as a hot-wire coil heater, or any means capable of generating heat, e.g., a plate-type heater, may also be used without limitation. The moisture absorbed by the desiccant 331 of the dehumidifier 330 may be released by the heat applied by the heater 340. The desiccant 331 dried by the heat provided from the heater 340 may provide a dehumidifying or drying atmosphere toward the opening 315 again.

The heater 340 may be disposed under the dehumidifier 330. When the heater 340 is operated, the inner space 311 of the housing 310, and more particularly, the desiccant 331 may be in a high-humidity status. The heat generated by the heater 340 is transferred upward through convection, radiation, or the like, and the heat may be efficiently transferred to the dehumidifier 330 disposed on the heater 340. The heater 340 may provide heat to the dehumidifier 330 after a humidity management process for providing a dehumidifying or drying atmosphere to the inkjet head 150 is finished. That is, the heater 340 may provide heat while the opening 315 is closed by the closer 320.

The dehumidifier 330 may further include the desiccant weight sensor 350. The desiccant weight sensor 350 may be mounted on the desiccant frame 333 or the mesh 335. The desiccant weight sensor 350 may measure a weight of the desiccant 331 in real time. According to an embodiment, when it is determined that the weight of the desiccant 331 is increased by a specific rate or more compared to an initial weight of the desiccant 331, the desiccant 331 may be replaced.

According to another embodiment, when it is determined that the weight of the desiccant 331 is increased by a specific rate or more compared to an initial weight of the desiccant 331, the weight of the desiccant 331 may be reduced by operating the heater 340 to evaporate moisture of the desiccant 331. When the desiccant 331 is dried by evaporating moisture, a period of use may be extended. As such, the desiccant 331 may be reused.

The flexible contact part 360 may be further provided on the housing 310. The flexible contact part 360 may be mounted around the opening 315. The flexible contact part 360 may use an O-ring, or any flexible means such as a rubber or elastic material may also be used without limitation. The flexible contact part 360 may be mounted around the opening 315 to minimize contact impact with the housing 310 when the inkjet head 150 approaches. Because the inkjet head 150 and the housing 310 are made of hard materials and thus may be damaged when brought into contact with each other, the flexible contact part 360 may absorb contact impact between the inkjet head 150 and the housing 310. In addition, the flexible contact part 360 may seal a gap to achieve close contact between the inkjet head 150 and the housing 310.

The humidity sensor 370 may be disposed in the housing 310 to sense a humidity of the inner space 311. Particularly, the humidity sensor 370 may be provided to sense a humidity near the opening 315. Based on the humidity information sensed by the humidity sensor 370, it may be determined whether the inkjet head management apparatus 300 is required to perform a humidity management process on the inkjet head 150. When the humidity is high, the heater 340 may be operated to reduce the humidity of the dehumidifier 330 or the inner space 311.

The droplet discharger 380 may be disposed in the housing 310 to purge and suck droplets from the nozzles 155 of the inkjet head 150. Droplets may remain at ends of the nozzles 155 after a printing process on the substrate S is finished. These droplets may deteriorate or be contaminated while the inkjet head 150 is moving in the printing system 100, and process failure may be caused when a subsequent printing process is performed while the droplets remain. Alternatively, when some nozzles are clogged with the droplets, the droplets may not be ejected well and thus process failure may be caused in a printing process. Therefore, a purger 381 may be provided to collect the droplets in the procedure of discharging the droplets remaining at the ends of the nozzles 155. The droplets falling into the purger 381 may be discharged to an external droplet processing means (not shown). A sucker 385 may suck the droplets remaining in the nozzles 155, by approaching the nozzles 155 and providing a suction pressure. When the nozzles 155 are clogged, the sucker 385 may unclog the nozzles 155 by using the suction pressure. A level of the suction pressure of the sucker 385 may be controlled by opening or closing a suction valve 387. The droplets sucked into the sucker 385 may be discharged to an external droplet processing means (not shown).

The vent 390 may be mounted through a side of the housing 310. The vent 390 may be provided to match a pressure of the inner space 311 of the housing 310 with an external pressure. An amount of external air introduced into the housing 310 may be controlled by opening or closing a vent valve 395 of the vent 390. A filter (not shown) for filtering out fine particles when external air is introduced may be further mounted on the vent 390.

For example, a negative pressure may be formed in the inner space 311 in the procedure of purging and sucking a waste liquid of the inkjet head 150. Because the droplets in the nozzles 155 may flow due to the negative pressure, the vent 390 may introduce the external air to maintain the inner space 311 of the housing 310 at atmospheric pressure. As another example, moisture evaporated by heating the dehumidifier 330 by the heater 340 may escape to the outside through the vent 390 not to remain in the inner space 311 of the housing 310.

The controller 400 may control a series of operations of the inkjet head management apparatus 300. For example, the controller 400 may control operation of the closer 320 in consideration of positions of the inkjet head 150 and the opening 315. As another example, the controller 400 may transmit a notification for replacing the desiccant 331, to a user based on the weight measurement data of the desiccant 331 sensed by the desiccant weight sensor 350, or control the heater 340 to operate to evaporate the moisture of the desiccant 331. As another example, the controller 400 may determine whether the inkjet head management apparatus 300 is appropriate to perform a humidity management process on the inkjet head 150, based on the humidity information sensed by the humidity sensor 370. As another example, the controller 400 may control opening or closing of the suction valve 387 or the vent valve 395.

Figure 4:
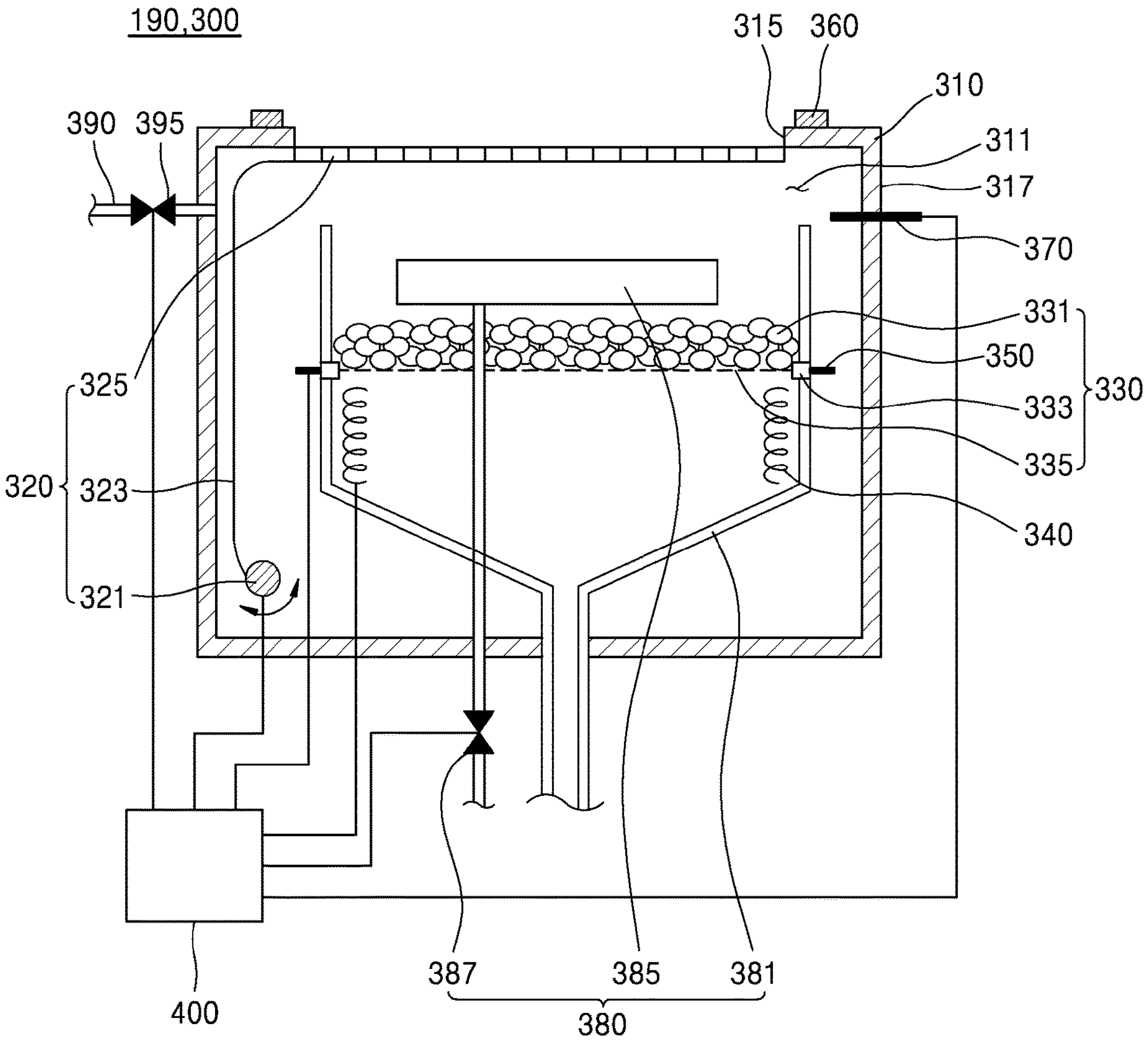
FIG. 4 is a side cross-sectional view showing a closed state of an inkjet head management apparatus, according to an embodiment of the present invention.
Figure 5:
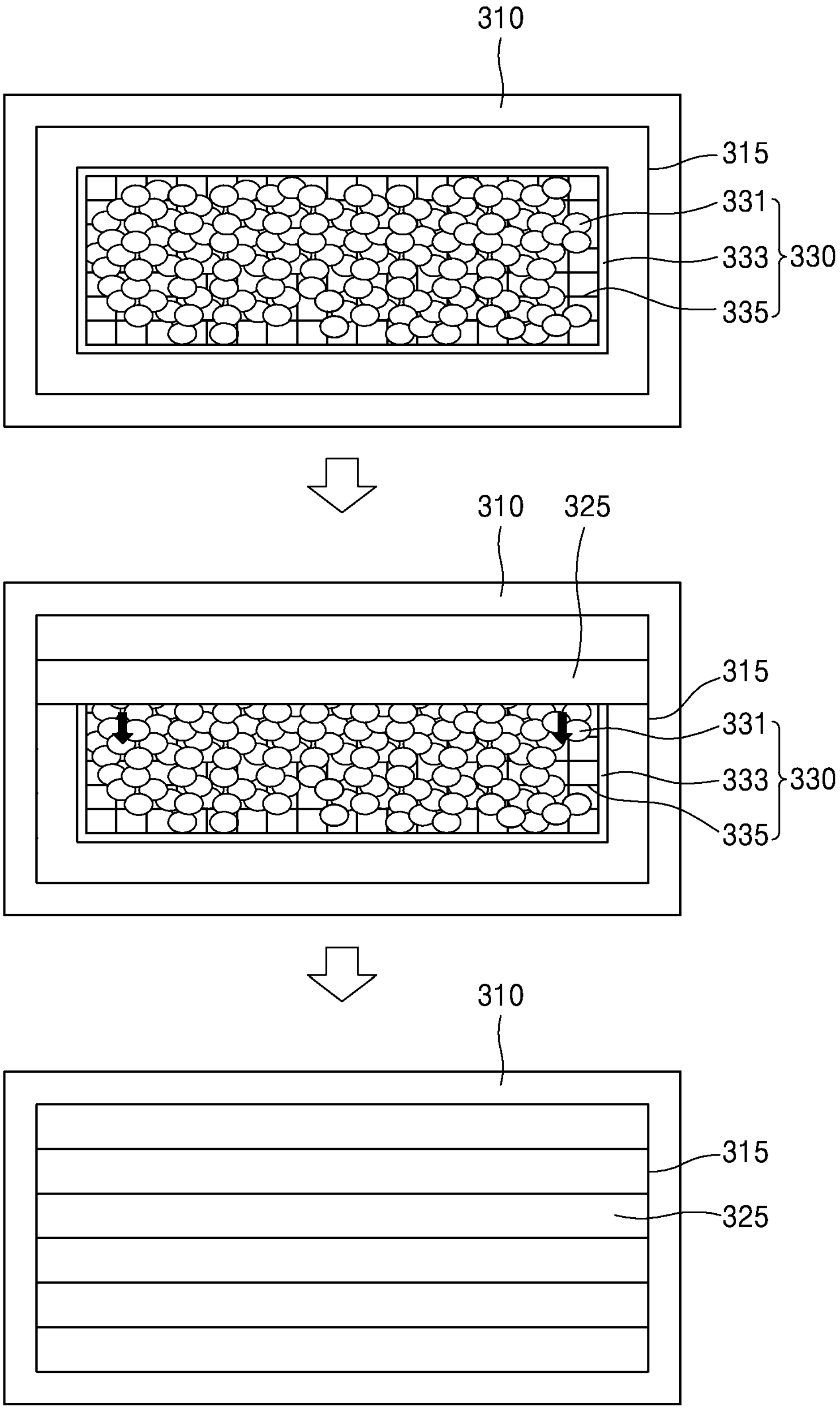
FIG. 5 includes plan views showing a procedure of closing an opening of an inkjet head management apparatus, according to an embodiment of the present invention.

FIG. 4 is a side cross-sectional view showing a closed state of the inkjet head management apparatus 300, according to an embodiment of the present invention. FIG. 5 includes plan views showing a procedure of closing the opening 315 of the inkjet head management apparatus 300, according to an embodiment of the present invention.

Referring to FIGS. 4 and 5, the opening 315 of the housing 310 may be closed by the closer 320. The power source 321 may provide power to move the shutter 325 to the opening 315 from a position other than the opening 315.

Referring to the first view of FIG. 5, the opening 315 is open. The power source 321 may provide power to position the shutter 325 at a potion other than the opening 315. This state may be a state immediately before the inkjet head 150 approaches the opening 315. Alternatively, this state may be a state in which the inkjet head 150 leaves the opening 315 immediately after a humidity management process of the inkjet head 150 is finished.

Referring to the second view of FIG. 5, the opening 315 may be partially closed. The power source 321 may provide power to position the shutter 325 at the opening 315, and the shutter 325 may move to the opening 315 to gradually close the opening 315.

Referring to the third view of FIG. 5, the opening 315 is completely closed. The power source 321 may provide power to position the shutter 325 at a portion corresponding to the opening 315. This state may be a state in which a dehumidifying or drying atmosphere is prepared by controlling a humidity of the inner space 311 of the housing 310 after a humidity management process of the inkjet head 150 is finished. Alternatively, this state may be a state in which the desiccant 331 is replaced or in which moisture contained in the desiccant 331 is evaporated by operating the heater 340.

In other words, the closer 320 may open the opening 315 only in a humidity management process of the inkjet head 150, and close the opening 315 in other processes. The procedure of FIG. 5 may also be performed in reverse order.

Referring back to FIG. 4, the housing 310 may provide the inner space 311 and the opening 315 may be closed by the closer 320. The inner space 311 of the housing 310 may be closed separately from an external environment.

Therefore, the inkjet head management apparatus 300 of the present invention may maintain a dehumidifying or drying atmosphere separately from the other elements of the printing system 100 without being directly affected by a printing process atmosphere in an inkjet printing process or by an external process atmosphere. In addition, because a dehumidifying atmosphere may be previously maintained in the inner space 311 of the housing 310, the dehumidifying atmosphere may be rapidly provided in a maintenance process of the inkjet head 150. That is, while previously maintaining the dehumidifying atmosphere in the inner space 311 of the housing 310 by closing the opening 315, when the inkjet head 150 approaches the opening 315, the opening 315 may be opened and the inkjet head 150 may be dehumidified or dried immediately.

Figure 6:
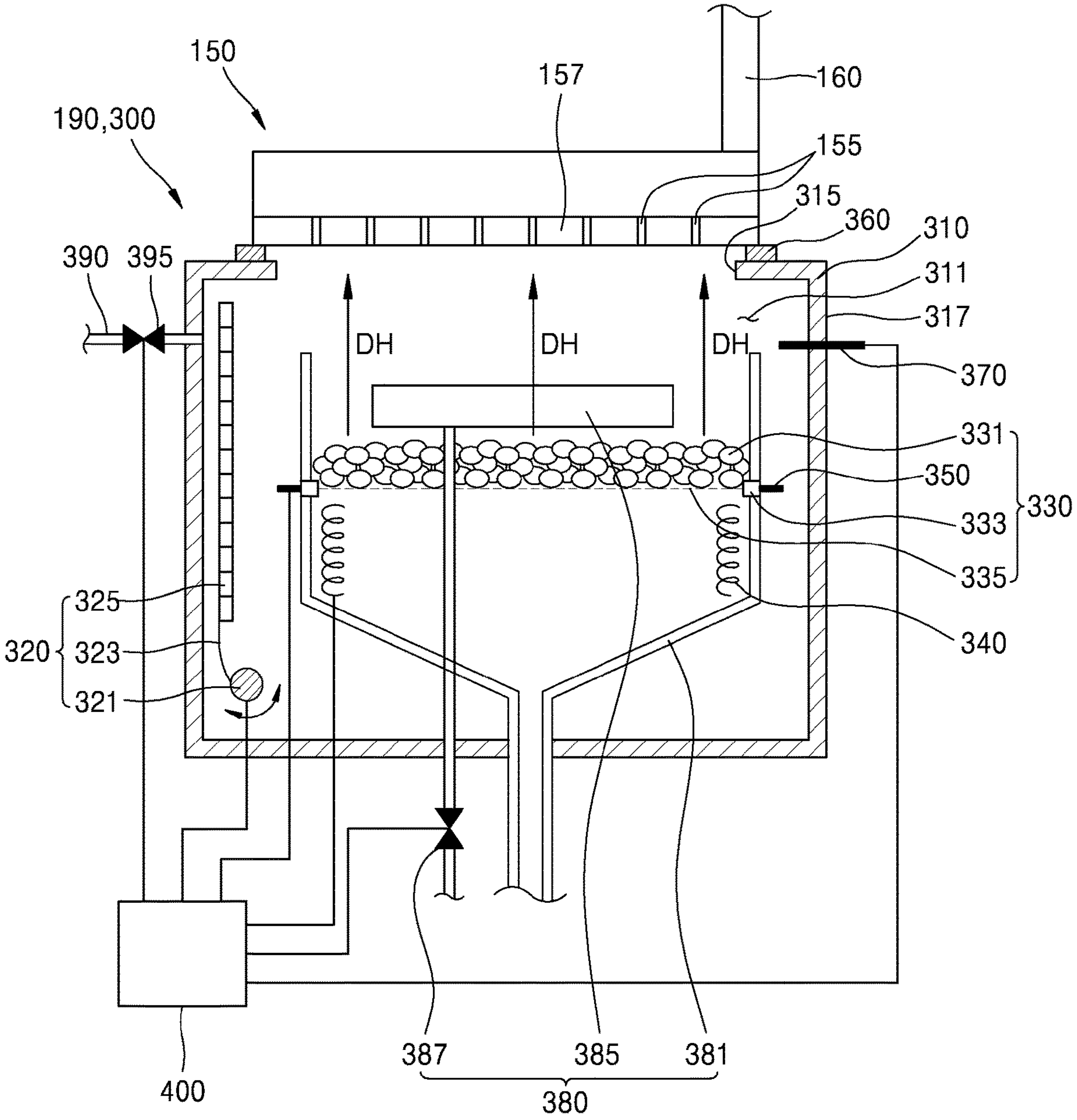
FIGS. 6 and 7 are side cross-sectional views showing a procedure in which an inkjet head approaches an inkjet head management apparatus and a humidity management process is performed, according to an embodiment of the present invention.
Figure 7:
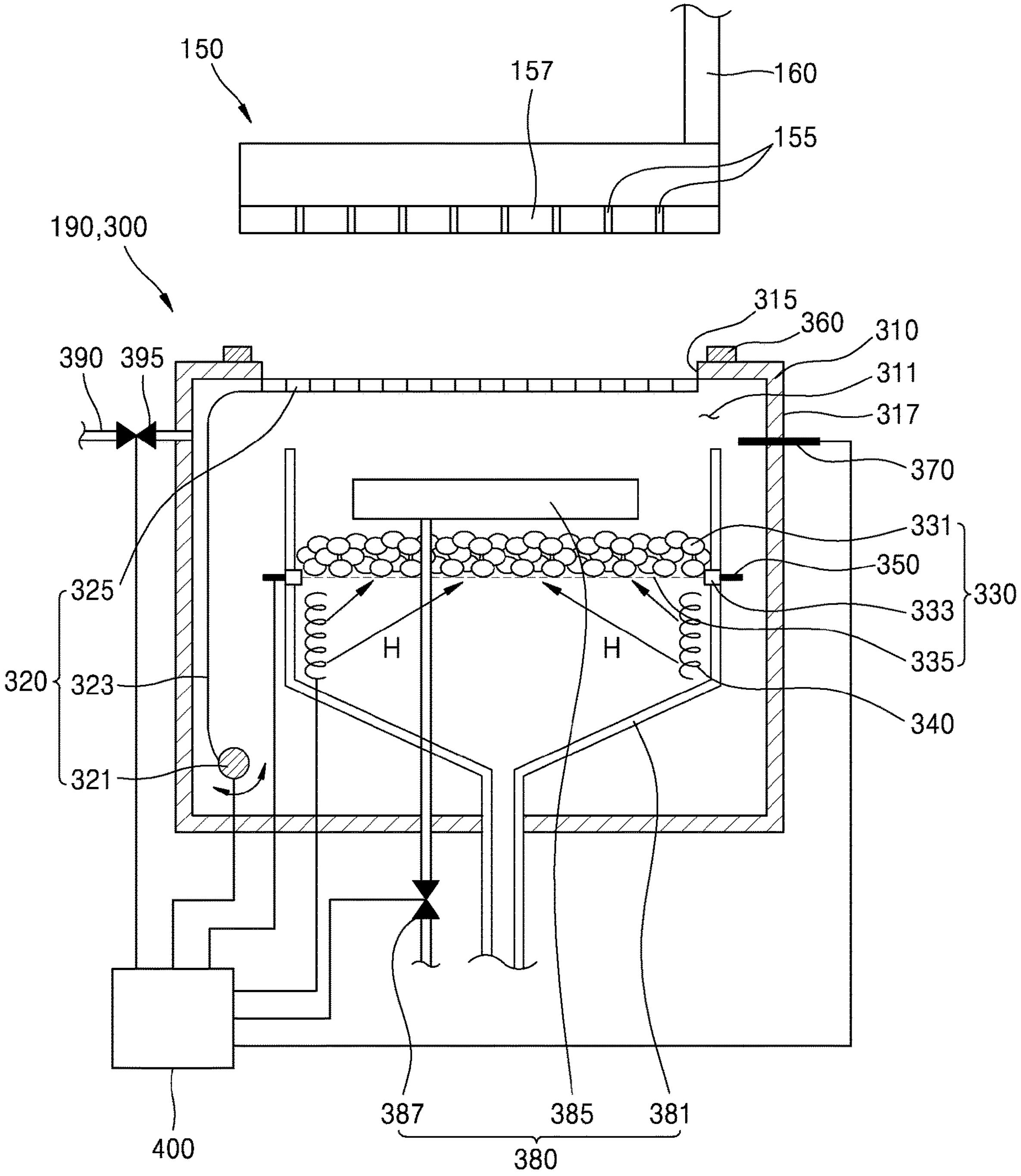

FIGS. 6 and 7 are side cross-sectional views showing a procedure in which the inkjet head 150 approaches the inkjet head management apparatus 300 and a humidity management process is performed, according to an embodiment of the present invention.

Initially, referring to FIG. 6, the inkjet head 150 may approach the opening 315. The opening 315 is open because the shutter 325 is moved into the housing 310. The inkjet head 150 may be moved in the first and second directions 10 and 20 by the head mover 160 (and the gantry mover 140) and positioned above the inkjet head management apparatus 300 (or the nozzle manager 190). Then, the head mover 160 may move the inkjet head 150 downward in the third direction 30 to approach the opening 315. The inkjet head 150 may be brought into close contact with the opening 315 and, in this case, the flexible contact part 360 may be interposed between the inkjet head 150 and the opening 315 to absorb contact impact.

While the inkjet head 150 is close to the opening 315, the dehumidifier 330 may provide a dehumidifying or drying atmosphere DH to the inkjet head 150. Because a space between the dehumidifier 330 and the opening 315 is already maintained in an atmosphere with a lower humidity than the outside of the inkjet head management apparatus 300, the nozzles 155 of the inkjet head 150 having approached the opening 315 may be reduced in humidity. That is, ends of the nozzles 155 may be dehumidified or dried and thus droplets included in the nozzles 155 may be prevented from deteriorating or being oxidized by moisture. Particularly, inorganic components of the droplets may be prevented from deteriorating or being oxidized by moisture.

A process of purging and sucking droplets from the nozzles 155 by operating the droplet discharger 380 may also be performed while the inkjet head 150 is close to the opening 315.

Then, referring to FIG. 7, after the humidity management process of the inkjet head 150 is finished, the head mover 160 may move the inkjet head 150 upward in the third direction 30 away from the opening 315. At the same time, the shutter 325 may move to the opening 315 to close the opening 315.

The nozzles 155 of the inkjet head 150 have gone through the management process including dehumidification, purging, and suction. The inkjet head 150 may be moved in the first and second directions 10 and 20 by the head mover 160 (and the gantry mover 140) and used for a printing process on the substrate S.

In addition, the inkjet head management apparatus 300 may operate to reduce the humidity of the inner space 311 again and maintain a dehumidifying or drying atmosphere. For example, the desiccant weight sensor 350 may measure a weight of the desiccant 331 and, when the weight of the desiccant 331 is greater than a preset value, the heater 340 may operate and provide heat H to evaporate moisture of the desiccant 331. The vent 390 may open the vent valve 395 to release the moisture evaporated from the desiccant 331, to the outside and, at the same time, maintain the inner space 311 at atmospheric pressure.

As described above, according to the inkjet head management apparatus 300 of the present invention, a lifespan of an inkjet head may be increased and deterioration of ink may be prevented by controlling a dehumidifying or drying atmosphere for the inkjet head. Furthermore, the dehumidifying or drying atmosphere may be separately maintained without being directly affected by a printing process atmosphere in an inkjet printing process, and the dehumidifying atmosphere may be rapidly provided in a maintenance process of the inkjet head.

As described above, according to an embodiment of the present invention, a dehumidifying or drying atmosphere may be controlled for an inkjet head.

In addition, according to an embodiment of the present invention, the dehumidifying or drying atmosphere may be separately maintained without being directly affected by a printing process atmosphere in an inkjet printing process, and the dehumidifying atmosphere may be rapidly provided in a maintenance process of the inkjet head.

Furthermore, according to an embodiment of the present invention, a lifespan of the inkjet head may be increased and deterioration of ink may be prevented.

However, the scope of the present invention is not limited to the above effects.

While the present invention has been particularly shown and described with reference to embodiments thereof, it will be understood by one of ordinary skill in the art that various changes in form and details may be made therein without departing from the scope of the present invention as defined by the following claims.

What is claimed is:

1. An inkjet head management apparatus for managing a humidity of an inkjet head comprising nozzles for ejecting droplets in an inkjet manner, the inkjet head management apparatus comprising:

- a housing having an opening on at least one surface thereof;
- a closer for opening or closing the opening of the housing; and
- a dehumidifier disposed in the housing to provide a dehumidifying atmosphere toward the opening when the opening is opened,
- wherein the dehumidifier comprises:
- a desiccant for providing a dehumidifying atmosphere toward the opening, and
- a desiccant supporter for supporting the desiccant, and
- wherein the desiccant supporter comprises a desiccant frame, and a mesh connected to the desiccant frame and allowing air to pass therethrough.

2. The inkjet head management apparatus of claim 1, wherein a cover made of a flame retardant or thermal insulation material is disposed on at least outer surfaces of the housing.

3. The inkjet head management apparatus of claim 1, wherein the opening is provided on a top surface of the housing, and the inkjet head approaches the top surface of the housing.

4. The inkjet head management apparatus of claim 3, further comprising a flexible contact part mounted around the opening on the housing to absorb impact upon contact with the inkjet head.

5. The inkjet head management apparatus of claim 1, wherein the closer opens the opening in a humidity management process of the inkjet head, and closes the opening in other processes.

6. The inkjet head management apparatus of claim 1, wherein the closer comprises:
- a power source mounted in the housing; and
- a shutter moved from the opening to a portion other than the opening by an operation of the power source.

7. The inkjet head management apparatus of claim 1, further comprising a heater disposed in the housing to provide heat to the dehumidifier.

8. The inkjet head management apparatus of claim 7, wherein the heater is disposed under the dehumidifier to provide heat to the dehumidifier while the opening is closed.

9. The inkjet head management apparatus of claim 7, further comprising a desiccant weight sensor for measuring a weight of the desiccant in the dehumidifier.

10. The inkjet head management apparatus of claim 9, wherein, when the weight of the desiccant is greater than a preset value, the heater provides heat to the desiccant to evaporate moisture of the desiccant and reduce the weight of the desiccant.

11. The inkjet head management apparatus of claim 1, further comprising a humidity sensor disposed in the housing to sense a humidity near the opening.

12. The inkjet head management apparatus of claim 1, further comprising a droplet discharger disposed in the housing to purge and suck droplets from the nozzles.

13. The inkjet head management apparatus of claim 12, further comprising a vent mounted through a side of the housing to maintain an inner space of the housing at atmospheric pressure.

14. An inkjet printing apparatus for performing printing on a substrate by ejecting droplets in an inkjet manner, the inkjet printing apparatus comprising:
- a substrate supporter for disposing the substrate thereon;
- an inkjet head comprising nozzles for ejecting droplets onto the substrate;
- a head mover for moving the inkjet head; and
- an inkjet head humidity manager for managing a humidity of the inkjet head,
- wherein the inkjet head humidity manager comprises:
- a housing having an opening on at least one surface thereof;
- a closer for opening or closing the opening of the housing; and
- a dehumidifier disposed in the housing to provide a dehumidifying atmosphere toward the opening when the opening is opened,
- wherein the dehumidifier comprises:
- a desiccant for providing a dehumidifying atmosphere toward the opening, and
- a desiccant supporter for supporting the desiccant, and
- wherein the desiccant supporter comprises a desiccant frame, and a mesh connected to the desiccant frame and allowing air to pass therethrough.

15. The inkjet printing apparatus of claim 14, wherein the head mover moves the inkjet head downward on the inkjet head humidity manager to dispose the nozzles under the inkjet head on the opening of the inkjet head humidity manager.

16. The inkjet printing apparatus of claim 14, wherein the closer closes the opening when the inkjet head performs printing on the substrate, and opens the opening in a humidity management process of the inkjet head.

17. The inkjet printing apparatus of claim 16, wherein, in the humidity management process of the inkjet head, the dehumidifier provides a dehumidifying atmosphere to the inkjet head to reduce deterioration or oxidization of droplets caused by moisture in the inkjet head.

18. An inkjet head management apparatus for managing a humidity of an inkjet head comprising nozzles for ejecting droplets in an inkjet manner, the inkjet head management apparatus comprising:
- a housing having an opening on a top surface thereof to allow the inkjet head to approach;
- a closer for opening or closing the opening of the housing;
- a dehumidifier disposed in the housing to provide a dehumidifying atmosphere toward the opening when the opening is opened; and
- a humidity sensor for sensing a humidity near the opening,
- wherein the dehumidifier comprises
- a desiccant for providing a dehumidifying atmosphere toward the opening; and
- a desiccant supporter for supporting the desiccant and comprising a mesh allowing air to pass therethrough,
- wherein the closer closes the opening when the inkjet head performs printing on the substrate, and opens the opening in a humidity management process of the inkjet head, and
- wherein, in the humidity management process of the inkjet head, the dehumidifier provides a dehumidifying atmosphere to the inkjet head to reduce deterioration or oxidization of droplets caused by moisture in the inkjet head.

* * * * *